United States Patent
Derman

(10) Patent No.: US 9,861,091 B2
(45) Date of Patent: Jan. 9, 2018

(54) SNAP TRAP ACTUATOR

(71) Applicant: Jay S. Derman, Temecula, CA (US)

(72) Inventor: Jay S. Derman, Temecula, CA (US)

( * ) Notice: Subject to any disclaimer, the term of this patent is extended or adjusted under 35 U.S.C. 154(b) by 0 days.

(21) Appl. No.: 15/411,821

(22) Filed: Jan. 20, 2017

(65) Prior Publication Data

US 2017/0238525 A1    Aug. 24, 2017

Related U.S. Application Data

(60) Provisional application No. 62/298,038, filed on Feb. 22, 2016.

(51) Int. Cl.
| | |
|---|---|
| *A01M 23/30* | (2006.01) |
| *A01M 23/24* | (2006.01) |
| *A01M 99/00* | (2006.01) |

(52) U.S. Cl.
CPC ............ *A01M 23/30* (2013.01); *A01M 23/24* (2013.01); *A01M 99/00* (2013.01)

(58) Field of Classification Search
CPC ............................... A01M 23/24; A01M 23/30
USPC ............................ 43/81, 81.5, 82, 83, 96, 97
See application file for complete search history.

(56) References Cited

U.S. PATENT DOCUMENTS

| | | | | |
|---|---|---|---|---|
| 68,776 | A * | 9/1867 | Miller ................... | A01M 23/22 43/62 |
| 553,372 | A * | 1/1896 | Waldurff ............... | A01M 23/30 43/81 |
| 558,317 | A * | 4/1896 | Sjelstad ................ | A01M 23/30 43/81 |
| 589,183 | A * | 8/1897 | Mariner ................ | A01M 23/22 43/62 |
| 641,356 | A * | 1/1900 | Ager ..................... | A01M 23/22 43/62 |
| 645,589 | A * | 3/1900 | Erickson ............... | A01M 23/30 43/83 |
| 717,002 | A * | 12/1902 | Hooker ................. | A01M 23/30 43/83 |
| 722,842 | A * | 3/1903 | Hooker ................. | A01M 23/30 43/83 |

(Continued)

FOREIGN PATENT DOCUMENTS

| | | | | |
|---|---|---|---|---|
| CH | 181739 | A * | 1/1936 | ............ A01M 23/30 |
| DE | 2034845 | A1 * | 1/1972 | ............ A01M 23/30 |

(Continued)

*Primary Examiner* — Darren W Ark
(74) *Attorney, Agent, or Firm* — Aaron McGushion

(57) ABSTRACT

The present improved animal trap and unique catch release mechanism eliminates substantial eating or removal of the bait without the trap activating and provides a dual means to activate the trap. This is accomplished by the present catch release mechanism having a sliding member which slides within a hole through the platform of the trap under the influence of gravity and a prop which holds at least a portion of the trap platform above a support surface. When the prop is destabilized by an external force, the prop's support of the platform is disturbed, permitting the platform to fall toward the support surface. The platform falls relative to the sliding member; and the sliding member is forced toward the catch by contact with the support surface, thus pushing the catch so that the catch releases the holding arm bar to activate the trap.

17 Claims, 3 Drawing Sheets

(56) References Cited

U.S. PATENT DOCUMENTS

| | | | | |
|---|---|---|---|---|
| 730,528 A * | 6/1903 | Gaston | A01M 23/30 | 43/81 |
| 744,343 A * | 11/1903 | Hooker | A01M 23/30 | 43/81 |
| 749,380 A * | 1/1904 | Hazel | A01M 23/30 | 43/83 |
| 869,594 A * | 10/1907 | Stone | A01M 23/30 | 43/81 |
| 871,809 A * | 11/1907 | Marks | A01M 23/30 | 43/81 |
| 874,654 A * | 12/1907 | Beaudry | A01M 23/22 | 43/62 |
| 965,618 A * | 7/1910 | Arbuckle | A01M 23/30 | 43/81 |
| 975,741 A * | 11/1910 | Alderman | A01M 23/30 | 43/81 |
| 1,016,671 A * | 2/1912 | Butler | A01M 23/30 | 43/81 |
| 1,069,461 A * | 8/1913 | Osborne | A01M 23/30 | 43/82 |
| 1,207,991 A * | 12/1916 | Owen | A01M 23/30 | 43/81 |
| 1,292,916 A * | 1/1919 | Sulenski | A01M 23/30 | 43/81 |
| 1,362,168 A * | 12/1920 | McQuaid | A01M 23/30 | 43/81 |
| 1,423,715 A * | 7/1922 | Hedberg | A01M 23/00 | 43/61 |
| 1,458,404 A * | 6/1923 | Goodman | A01M 23/30 | 43/82 |
| 1,462,102 A * | 7/1923 | Dodson | A01M 23/30 | 43/82 |
| 1,472,666 A * | 10/1923 | Munroe | A01M 23/30 | 43/81.5 |
| 1,483,688 A * | 2/1924 | Grant | A01M 23/30 | 43/81 |
| 1,668,937 A * | 5/1928 | Brown | A01M 23/00 | 43/62 |
| 1,850,534 A * | 3/1932 | Clausen | A01M 23/30 | 43/88 |
| 1,929,286 A * | 10/1933 | Osborne | A01M 23/30 | 43/81 |
| 1,967,629 A * | 7/1934 | Ruby | A01M 23/30 | 43/81 |
| 2,077,657 A * | 4/1937 | Zager | A01M 23/18 | 43/81 |
| 2,190,089 A * | 2/1940 | Sund | A01M 23/30 | 43/81 |
| 2,209,522 A * | 7/1940 | Houtsinger | A01M 23/30 | 43/83 |
| 2,263,161 A * | 11/1941 | Brust | A01M 23/30 | 43/81 |
| 2,544,295 A * | 3/1951 | Brust | A01M 23/30 | 43/81 |
| 2,598,205 A * | 5/1952 | Altham | A01M 23/30 | 43/81 |
| 2,602,260 A * | 7/1952 | Marsden | A01M 23/30 | 43/81.5 |
| 2,648,930 A * | 8/1953 | Salokar | A01M 23/30 | 43/81 |
| 3,394,488 A * | 7/1968 | Kruger | A01M 23/30 | 43/81 |
| 4,270,299 A * | 6/1981 | Long | A01M 23/22 | 43/62 |
| 4,360,986 A * | 11/1982 | Dushey | A01M 23/30 | 43/82 |
| 5,001,857 A * | 3/1991 | McDaniel | A01M 23/30 | 43/81 |
| 5,588,249 A * | 12/1996 | Flinner | A01M 23/24 | 43/61 |
| 6,023,878 A * | 2/2000 | Fore | A01M 23/08 | 43/61 |
| 6,655,077 B1 * | 12/2003 | Trevino | A01M 23/30 | 43/81 |
| 6,868,633 B2 * | 3/2005 | Schroedl | A01M 23/26 | 43/80 |
| 7,069,688 B2 * | 7/2006 | Hill | A01M 23/30 | 43/80 |
| 7,458,182 B2 * | 12/2008 | Johnson | A01M 23/18 | 43/67 |
| 7,607,254 B1 * | 10/2009 | Huang | A01M 23/16 | 43/81 |
| 7,908,790 B2 * | 3/2011 | Mahony | A01M 23/30 | 43/81 |
| 8,397,426 B2 * | 3/2013 | Rodgers | A01M 23/16 | 43/81 |
| 8,943,741 B2 * | 2/2015 | Watson | A01M 23/30 | 43/81 |
| 2013/0036658 A1 * | 2/2013 | Bayne | A01M 23/005 | 43/81 |

FOREIGN PATENT DOCUMENTS

| | | | | |
|---|---|---|---|---|
| EP | 2789233 A1 * | 10/2014 | | A01M 23/30 |
| GB | 383051 A * | 11/1932 | | A01M 23/30 |
| GB | 498190 A * | 1/1939 | | A01M 23/30 |
| GB | 569318 A * | 5/1945 | | A01M 23/30 |
| GB | 570012 A * | 6/1945 | | A01M 23/30 |
| GB | 602049 A * | 5/1948 | | A01M 23/30 |
| GB | 1000538 A * | 8/1965 | | A01M 23/24 |
| RU | 2038788 C1 * | 7/1995 | | |

* cited by examiner

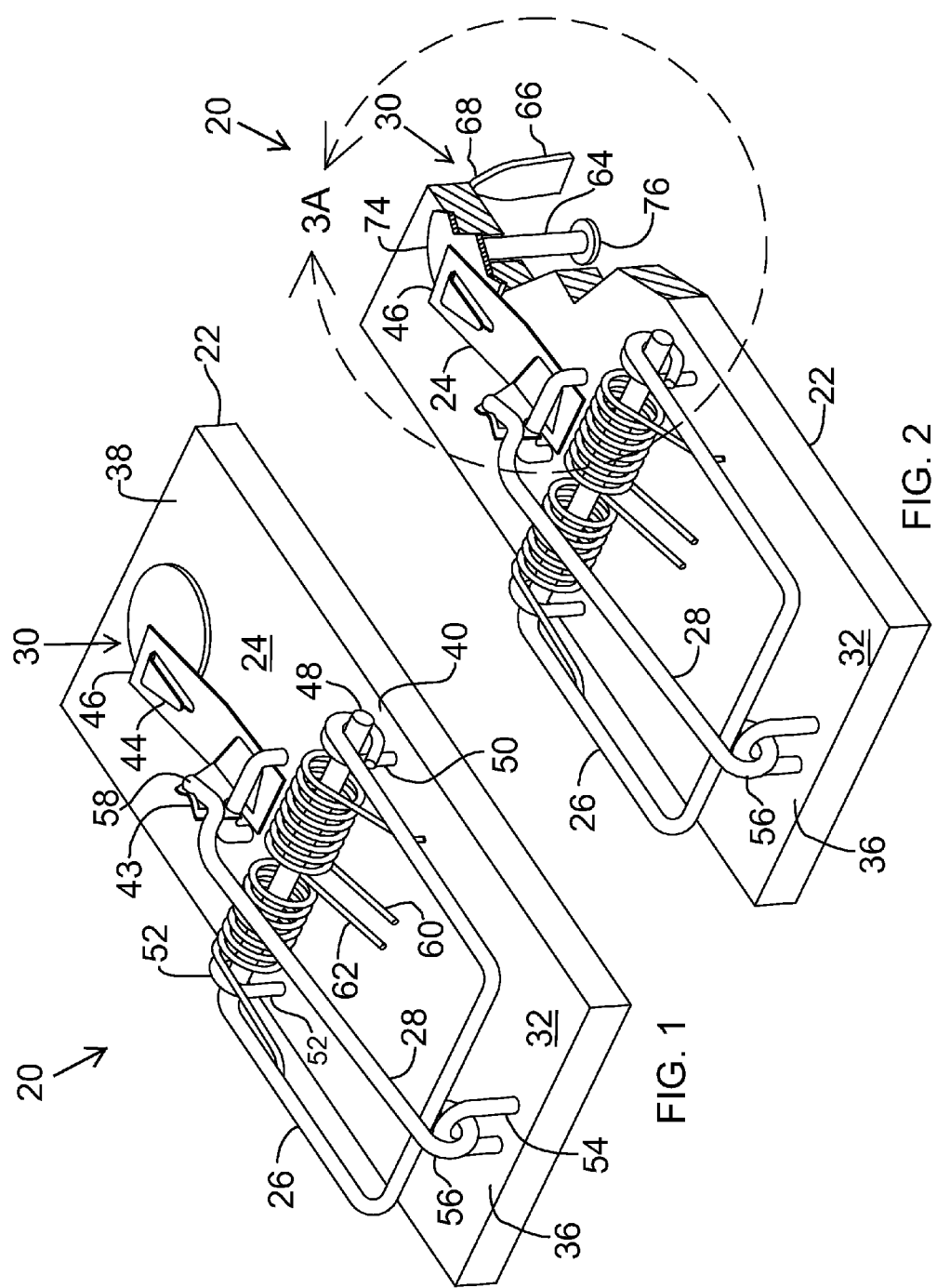

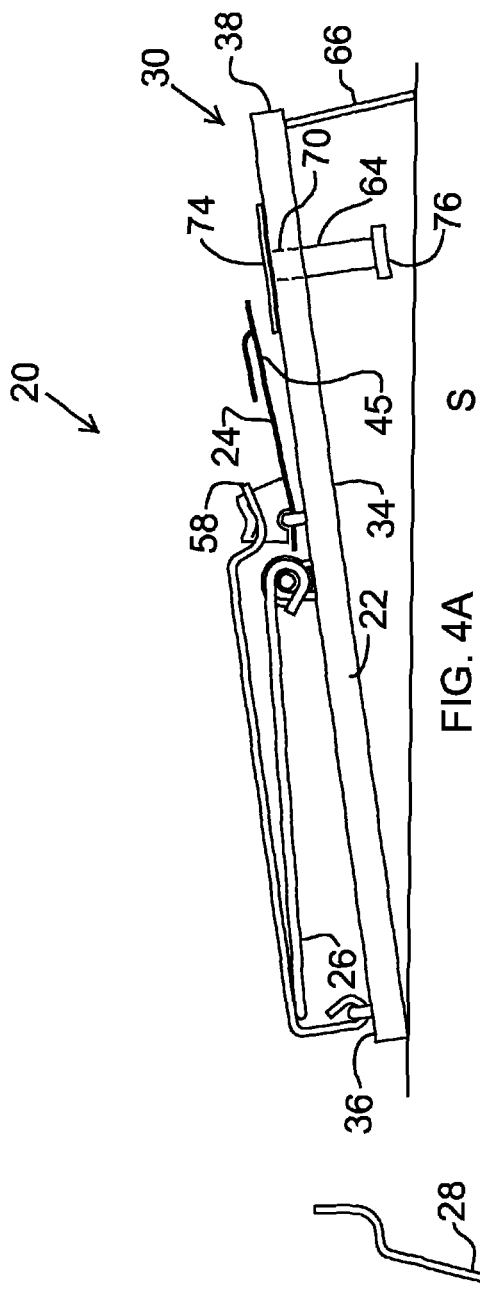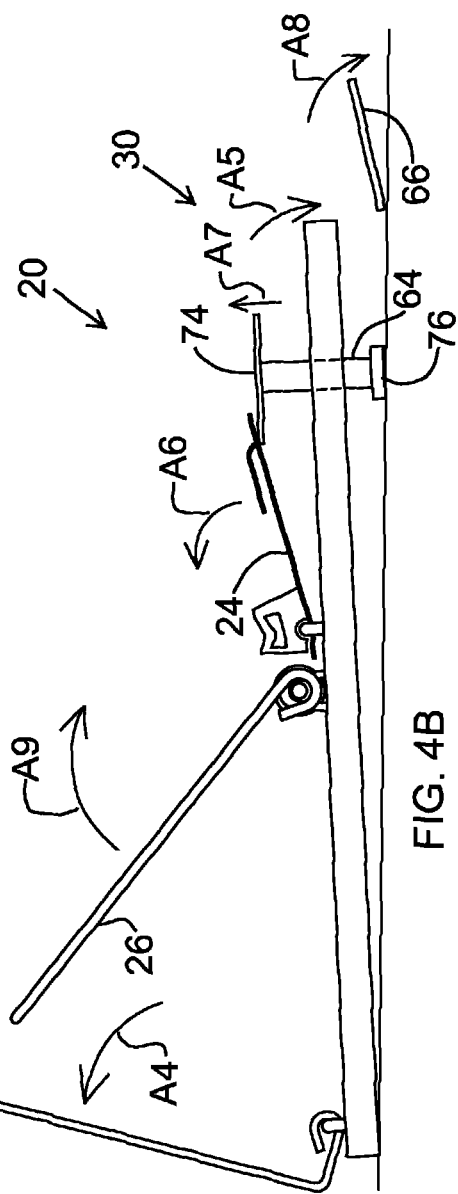
FIG. 4A
FIG. 4B

SNAP TRAP ACTUATOR

RELATED APPLICATIONS

This application claims benefit from U.S. Provisional Application for Patent Application No. 62/298,038 filed Feb. 22, 2016, which is hereby incorporated by reference in its entirety.

BACKGROUND

The field of the present device and method relates to spring-loaded animal traps, and more particularly, to catch release mechanism for a spring-loaded animal trap, such as a mouse trap, animal trap, or the like.

With standard mouse traps, also known as snap traps or spring-loaded arm bar mouse traps, the catch serves two primary purposes, to restrain the holding arm bar when the trap is set and to hold the bait. In order for the trap to activate, the rodent must apply sufficient force on the catch through the eating or manipulation of the attached bait to cause the catch to release the holding arm bar. It is too often the case that the mouse can gently eat the bait without activating the trap. Thus, when later checked, the trap may still be set, yet the catch cleaned of the bait. What is needed is a trap that senses more than just direct pressure on the catch and accounts for other movements or applications of force applied on other portions of the trap.

SUMMARY

The present improved animal trap and unique catch release mechanism or snap trap actuator eliminates substantial eating or removal of the bait without the trap activating and provides a dual means to activate the trap. This is accomplished by the present catch release mechanism having a sliding member which slides within a hole through the platform of the trap under the influence of gravity and a prop which holds at least a portion of the trap platform above a support surface. When the prop is destabilized by an external force (e.g., applied by a rodent on any part of the trap), the prop's support of the platform is disturbed, permitting the platform to fall toward the support surface. The platform falls relative to the sliding member; and the sliding member is forced toward the catch by contact with the support surface, thus pushing the catch so that the catch releases the holding arm bar to activate the trap.

In a first embodiment, an animal trap is provided and generally comprises a platform having a top surface with a first section, a second section, and a middle section located between the first section and the second section; a catch attached to the top surface, the catch being to move relative to the top surface; a pivoting kill bar hammer rotationally attached to the middle section of the platform and being biased towards the second section; a holding arm bar with a proximal end and a distal end, the holding arm bar attached through a pivot to the first section of the platform by the proximal end, when in a set configuration the distal end of the arm bar releasably coupled to the catch to hold the kill bar hammer toward the first section; and a catch release mechanism comprising a sliding member and a prop, the prop supporting the platform in a tilted orientation above the support surface; where, when the prop is destabilized, the platform drops downwards to push the sliding member upwards by contact with the support surface and into the catch causing the catch to move and release the distal end of the holding arm bar to permit the pivoting kill bar hammer to return towards the second end.

Optionally, the platform may further comprise a bottom surface opposite the top surface, the prop is pivotally connected to the bottom surface. The prop may be attached to or separable from the platform or other part of the trap. The prop may have a tapered end. The platform may have a through hole into which the sliding member is inserted, a portion of the sliding member is positioned beneath the catch when in the set configuration. As an option, the sliding member comprises a rod and the portion of the sliding member is an enlarged head. The sliding member may further comprise an enlarged base, the enlarged head is positioned above the top surface and the enlarged base is positioned below the top surface to trap the sliding member within the through hole. The rod of the sliding member may slide freely within the through hole.

In the set configuration, the prop holds a second portion of the platform a distance above the support surface with the enlarged base held slightly above the support surface and the enlarges head resting on the top surface. The prop may be destabilized by movement of the platform or any part of the trap. Optionally, the bait can be applied to the catch release mechanism and/or the second section of the platform.

In another embodiment, an animal trap is provided and generally comprises a platform comprising a top surface that supports a pivoting kill bar hammer, a catch, and a holding arm bar, in a set configuration, the pivoting kill bar hammer repositioned from an initial position against a bias and held in a set position by the holding arm bar releasably coupled to the catch; and a catch release mechanism comprising a sliding member and a prop, the prop supporting the platform in a tilted orientation above the support surface; where, when the prop is destabilized, the platform drops downwards to push the sliding member upwards by contact with the support surface and into the catch causing the catch to move and release the distal end of the holding arm bar to permit the pivoting kill bar hammer to return towards the initial position.

BRIEF DESCRIPTION OF THE SEVERAL VIEWS OF THE DRAWINGS

FIG. 1 is a perspective view of the embodiment of the present animal trap with the catch release mechanism;

FIG. 2 is a partial cross-sectional perspective view of the embodiment of FIG. 1 more clearly illustrating the catch release mechanism;

FIG. 4A is a side view of the animal trap of FIG. 1, showing the animal trap in the set configuration; and FIG. 4B is a side view of the animal trap of FIG. 1, showing the animal trap in the set activated state or configuration.

Figures 3A, 3B:
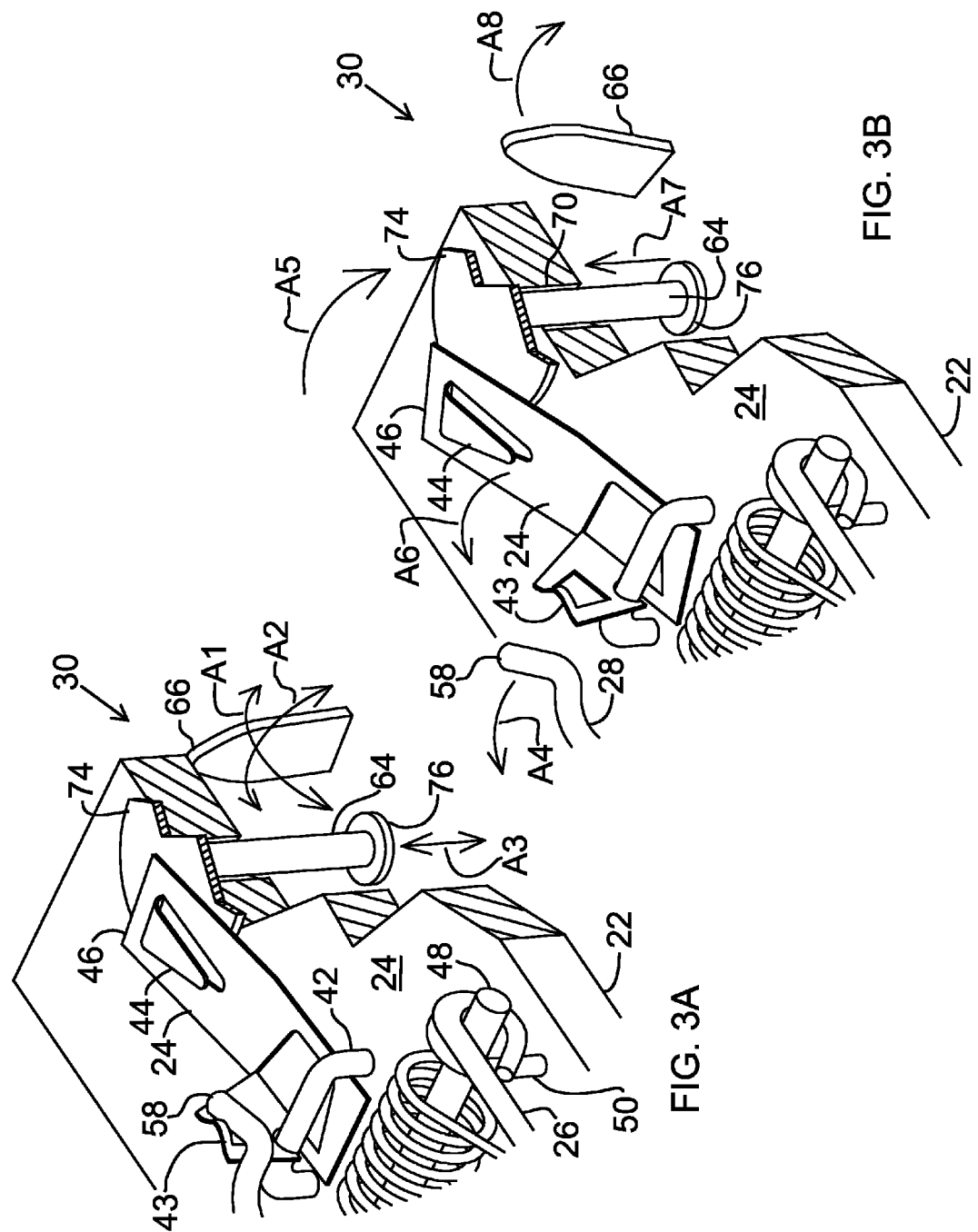
FIG. 3A is a magnified partial cross-sectional perspective view of FIG. 2, showing the animal trap in the set configuration.
FIG. 3B is a magnified partial cross-sectional perspective view of FIG. 2, showing the animal trap in the activated state or configuration.

LISTING OF REFERENCE NUMERALS OF FIRST-PREFERRED EMBODIMENT animal trap 20
platform 22
catch 24
pivoting kill bar hammer 26 holding arm bar 28
catch release mechanism 30
top surface 32
bottom surface 34
first section 36
second section 38
middle section 40
catch staple 42
catch hook 43
bait holder 44
catch bottom surface 45
catch distal end 46
rod 48
rod staple 50, 52
bar staple 54
bar proximal end 56
bar distal end 58
hammer spring 60, 62
sliding member 64
prop 66
tapered end 68
through hole 70
sliding rod 72
enlarged head 74
enlarged base 76
support surface
arrow A1, A2, A3, A4, A5, A6, A7, A8, A9

DESCRIPTION OF THE PREFERRED EMBODIMENTS

The detailed descriptions set forth below in connection with the appended drawings are intended as a description of embodiments, and is not intended to represent the only forms in which the present securement system may be constructed and/or utilized. The descriptions set forth the structure and the sequence of steps for constructing and operating the securement system in connection with the illustrated embodiments. It is to be understood, however, that the same or equivalent structures and steps may be accomplished by different embodiments that are also intended to be encompassed within the spirit and scope of the invention.

Referring first to FIGS. 1 and 2, an animal trap (20) is disclosed, generally having a wood platform (22) (although other materials may be used, such as metal, plastic, linoleum, acrylic glass, or a platform with a veneer to match the support surface, etc.) with a top surface (32) having a first section (36), a second section (38), and a middle section (40) between the first section (36) and the second section (38). The sections (34, 36, 38) are not precisely delineated, but instead, represent three general areas of the top surface (32) upon which various parts of the trap (20) may be positioned.

A bar staple (54) is located within the first section (36), with the holding arm bar (28) attached to the bar staple (54) by a loop on the end to create a pivoting attachment. Of course, because the bar staple (54) is U-shaped with the end of the holding arm bar (28) looped about it, the holding arm bar (28) is permitting to pivot and move about the bar staple (54) in multiple directions. The pivoting kill bar hammer (26) is generally made from a single wire bent into a rectangular shape, with one side of the rectangle held, much like an axle, by a first rod staple (50) and a second rod staple (52) pinned to the middle section (40) of the top surface (32). One or more springs (60, 62) (such as a torsion spring) biases the rotation of the pivoting kill bar hammer (26) towards the second section (38) of the top surface (32) with enough force and impulse to capture a rodent between the pivoting kill bar hammer (26) and the second section (38). A catch staple (42) pivotally holds the catch (24) to the top surface (32) within or near the middle section (40). The catch (24) includes a bait holder (44) and a catch hook (43) configured to engage the distal end (58) of the holding arm bar (28) when the animal trap (20) is in the set configuration, as shown in FIG. 1.

As with standard spring-loaded traps, in the set configuration, the pivoting kill bar hammer (26) is rotated from the second section (38) and towards the first section (36) against the biasing force of the springs (60, 62). As the pivoting kill bar hammer (26) is manually held towards the first section (36), the holding arm bar (28) is rotated over the pivoting kill bar hammer (26) such that the proximal end (58) of the holding arm bar (28) touches the pivoting kill bar hammer (26) to arrest its movement. Then, the distal end (58) of the holding arm bar (28) is positioned beneath the catch hook (43) so that the distal end (58) pushes up on the catch hook (43) to provide a temporary engagement. If activated, the spring force acting on the pivoting kill bar hammer (26) will cause the distal end (58) to disengage from the catch hook (43) swing back, and release the pivoting kill bar hammer (26) so that it strikes the second section (38) of the top surface (32).

The catch release mechanism (30) is illustrated more clearly in the partial cross-section of FIG. 2. The illustrated embodiment of the catch release mechanism (30) comprises a sliding member (64) positioned in a through hole (70) formed through the platform (22), from the top surface (32) to the bottom surface (34). The sliding member (64) is permitted to axially slide within the through hole (70), preferably freely sliding or with little resistance. The through hole (70) may be lined with a tubular liner made of plastic, metal, or other material that permits the sliding member (64) to slide without undue friction or binding. When the platform (22) is lifted above the support surface (S), under the influence of gravity, the sliding member (64) slides downward towards the earth. An enlarged head (74) is connected to a top end of the sliding member (64) and is positioned above the top surface (32) and beneath the catch (24). An enlarged base (76) is connected to a bottom end of the sliding member (64) and is positioned beneath the bottom surface (34) of the platform. The enlarged head (74) and the enlarged base (76) limit the travel of the sliding member (64) so that the sliding member (64) remains in the through hole (70). Further the enlarged head (74) is sized so that it pushes upon the catch (24) (preferably on the catch distal end (46) or any other portion) when the sliding member (64) slides upwards towards the top surface (32). The enlarged head (74) and the enlarged base (76) may be made of various materials, such as metal, plastic, and such. The enlarged base (76) may further include a rubber foot to enhance grip on the support surface (S). The sliding member (64) may be a rod, tube, strip, square stock, or any other configuration that permits sliding within the through hole (70).

Still referring to FIG. 2, the catch release mechanism (30) further comprises a prop (66) or other support that provides an unstable support to hold at least a portion of the platform (22) above a support surface (S). In the present example embodiment, the prop (66) is a small wood board with a tapered end (68). However, the prop may be made of a length of wire, a rod, a rectangular sick, toothpick-like structure, nail-like structure, or any other configuration that provides temporary support of the platform (22) that is easily destabilized by an external force applied to any or most any portion of the animal trap (20). In the illustrated example, the prop (66) is stood between the bottom surface (34) of the platform (22) and the support surface (S), held in place through frictional engagement with both surfaces. In an alternate embodiment (not shown), a wire hinged to a staple on the bottom surface (34) provides a prop which acts as an unstable support. Thus, the prop (66) may be permanently attached to the trap (20) or temporarily engaged.

Referring to FIG. 3A, a magnified view of FIG. 2 is provided to more clearly illustrate the operation and components of the present catch release mechanism (30). This figure, as well as and FIG. 4A, illustrates the animal trap (20) in the set or armed configuration, with the prop (66) supporting the second section (38) a distance above the support surface (S) and the first section resting on the support surface (S), forming a lean-to like arrangement. In the illustrated embodiment, the height of the prop (66) is sufficient to permit the sliding member (64) to slide downward within the through hole (70), so that the enlarged head (74) rests on the top surface (32) and the enlarged base (76) is held slightly above the support surface (S). Although, in another embodiment (not illustrated), the enlarged base (76) rests upon the support surface (S), holding the enlarged head (74) slightly above the top surface (32). Arrows (A1, A2) illustrate that the prop (66) is permitted to collapse or fall in any direction if the platform (22) were to be shifted or jarred relative to the support surface (S). The frictional engagement between the prop (66) and the support surface (S) and the platform (22) is easily overcome by movement, vibration, shifting, or other forms of contact between an animal and the trap (20). Arrow (A3) illustrates the up and down axial movement of the sliding member (64) within the through hole (70).

FIGS. 3B and 4B illustrate the animal trap (20) in the triggered or activated configuration, after an animal has applied a force to the platform (22), the catch (24), the enlarged head (74), the prop (66), or any other portion of the animal trap (20). As discussed above, a sufficient external force applied by the animal will cause the prop to break contact and slide relative to one or both of the support surface (S) and the bottom surface (34). Arrow (A8) illustrates the prop (66) falling down and permitting the platform (22) to drop toward the support surface (S) under the influence of gravity.

As the platform (22) drops down, the enlarged base (76) of the sliding member (64) contacts the support surface (S), which pushes upwards on the sliding member (64) pushing the sliding member (64) upward and toward the catch (24). Because the enlarged head (74) is positioned beneath the catch (24), upward movement of the sliding member (64) (indicated by arrow (A7)) causes the enlarged head (74) to rotate or otherwise move the catch (24) about the staple (42), as indicated by arrow (A6), to disengage the catch hook (43) from the distal end (58) of the holding arm bar (28), to release the holding arm bar (28) and permit its rotation (as indicated by arrow (A4)) under the spring force of the pivoting kill bar hammer (26) rotating back toward the second section (38) (as indicated by arrow (A9)), thus trapping the animal.

With the present animal trap (20), the catch may be released in two ways, first, by the traditional manner where the animal torques the catch itself or by simply shifting the platform (22) to knock over the prop (66). The bait (peanut butter, etc.) may be placed on the catch (24), on the enlarged head (74), on the top surface (32), or any portion of the animal trap (20) which would position the animal between the platform (22) and the pivoting kill bar hammer (26) when the trap (20) is activated. Although the sliding member (64) is shown with an enlarged head (74) and enlarged base (76) these are illustrative of just one embodiment, and are not required. An alternate sliding member may include a wire inserted through the through hole (70), with the ends of the wire bent at a ninety degree angle to prevent retraction. The present animal trap (20) provides a substantially increased level of sensitivity and easily activates upon the slightest nudge, even while the animal is merely investigating the bait. Thus, consumption of the bait is not required to activate the trap.

While particular forms of the present securement system have been illustrated and described, it will also be apparent to those skilled in the art that various modifications can be made without departing from the spirit and scope of the design. Accordingly, it is not intended that the invention be limited except by the claims.

What is claimed is:

1. An animal trap utilizing bait for positioning on a support surface, the animal trap comprising:
    a platform comprising a bottom surface opposite a top surface that supports a pivoting kill bar hammer, a catch, and a holding arm bar, in a set configuration, the pivoting kill bar hammer repositioned from an initial position against a bias and held in a set position by the holding arm bar releasably coupled to the catch, the platform further comprising a through hole formed through the top surface and the bottom surface; and
    a catch release mechanism comprising a sliding member and a prop, the prop supporting the platform in a tilted orientation above the support surface, the sliding member is inserted within and slides freely within the through hole;
    wherein, when the prop is knocked over, the platform drops downwards to push the sliding member axially upwards by contact with the support surface and into the catch causing the catch to move and release a distal end of the holding arm bar to permit the pivoting kill bar hammer to return towards the initial position.

2. The animal trap of claim 1 wherein the prop separates from the platform when the prop is knocked over.

3. The animal trap of claim 1 wherein a portion of the sliding member is positioned beneath the catch when in the set configuration.

4. The animal trap of claim 3 wherein the portion of the sliding member is an enlarged head.

5. The animal trap of claim 4 wherein the sliding member further comprises an enlarged base, the enlarged head is positioned above the top surface and the enlarged base is positioned below the top surface to trap the sliding member within the through hole.

6. The animal trap of claim 5 wherein a rod portion of the sliding member slides freely within the through hole.

7. The animal trap of claim 5 wherein, in the set configuration, the enlarged base is held slightly above the support surface and the enlarged head resting on the top surface.

8. An animal trap utilizing bait for positioning on a support surface, the animal trap comprising:
    a platform having a top surface with a first section, a second section, and a middle section located between the first section and the second section, a through hole being formed through the platform;
    a catch attached to the top surface, the catch being to move relative to the top surface;
    a pivoting kill bar hammer rotationally attached to the middle section of the platform and being biased towards the second section;

a holding arm bar with a proximal end and a distal end, the holding arm bar attached through a pivot to the first section of the platform by the proximal end, when in a set configuration the distal end of the arm bar releasably coupled to the catch to hold the kill bar hammer toward the first section; and a catch release mechanism comprising a sliding member and a prop, the prop temporarily engaged with the platform and supporting the platform beneath the second section in a tilted orientation above the support surface with the first section resting on the surface, the sliding member is inserted within and slides freely within the through hole, the sliding member comprising an enlarged head positioned above the top surface to limit travel of the sliding member within the through hole so that the sliding member is prevented from sliding through the through hole when in the tilted orientation;

wherein, when the prop is destabilized and knocked over relative to the platform, the platform drops downwards to push the sliding member axially upwards by the sliding member contacting the support surface and pushing the sliding member into the catch causing the catch to move and release the distal end of the holding arm bar to permit the pivoting kill bar hammer to return towards the second section.

9. The animal trap of claim 8 wherein the prop separates from the platform when the prop is knocked over.

10. The animal trap of claim 9 wherein the prop comprises a tapered end contacting the platform.

11. The animal trap of claim 8 wherein the enlarged head is positioned beneath the catch when in the set configuration.

12. The animal trap of claim 11 wherein the sliding member further comprises an enlarged base, the enlarged head is positioned above the top surface and the enlarged base is positioned below the top surface to trap the sliding member within the through hole.

13. The animal trap of claim 12 wherein a rod portion of the sliding member slides freely within the through hole.

14. The animal trap of claim 13 wherein, in the set configuration, the enlarged base is held slightly above the support surface and the enlarged head resting on the top surface.

15. The animal trap of claim 8 wherein the prop is knocked over by movement of the platform.

16. The animal trap of claim 8 wherein the bait can be applied to the catch release mechanism.

17. The animal trap of claim 8 wherein the bait can be applied to the second section of the platform.

* * * * *